US008482636B2

(12) United States Patent
Cohen et al.

(10) Patent No.: US 8,482,636 B2
(45) Date of Patent: Jul. 9, 2013

(54) DIGITAL ZOOM ON BAYER

(75) Inventors: Noy Cohen, Tel-Aviv (IS); Eliezer Uri Mendlovic, Tel-Aviv (IS)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 417 days.

(21) Appl. No.: 12/774,486

(22) Filed: May 5, 2010

(65) Prior Publication Data

US 2011/0273593 A1 Nov. 10, 2011

(51) Int. Cl.
*H04N 5/228* (2006.01)
*H04N 5/262* (2006.01)
*H04N 9/083* (2006.01)
*H04N 3/14* (2006.01)
*H04N 5/335* (2011.01)
*H04N 9/04* (2006.01)

(52) U.S. Cl.
USPC .............. 348/240.2; 348/222.1; 348/280

(58) Field of Classification Search
USPC ............. 348/222.1, 240.99–240.2, 273, 280
See application file for complete search history.

(56) References Cited

U.S. PATENT DOCUMENTS

| 7,092,020 B2* | 8/2006 | Yoshikawa | 348/280 |
| 8,085,320 B1* | 12/2011 | Khan et al. | 348/241 |
| 2003/0058354 A1 | 3/2003 | Parulski et al. | |
| 2010/0045831 A1 | 2/2010 | Tanizoe | |
| 2011/0141321 A1* | 6/2011 | Tang et al. | 348/240.99 |

FOREIGN PATENT DOCUMENTS

| EP | 0 632 663 A2 | 1/1995 |
| WO | WO 2005/106787 A1 | 11/2005 |

OTHER PUBLICATIONS

Digital Camera Zooming Based on Unified CFA Image Processing Steps by R. Lukac et al published 2004.*
Bayer Pattern Based CFA Zooming/ CFA Interpolation Framework by Lukac et al presented in Thurs Session of EUSIPCO 2004 Sep. 6-10, 2004, Vienna Austria.*
European Patent Office, "Invitation to Pay Additional Fees and, Where Applicable, Protest Fee" received in International application No. PCT/EP2011/057154 dated Jul. 6, 2011, 6 pages.
Current Claims of PCT International application No. PCT/EP2011/057154 dated Jul. 2011, 4 pages.
"Notification of Transmittal of the International Search Report and the Written Opinion of the International Searching Authority, or the Declaration" received in PCT International Application No. PCT/EP11/57154 dated Oct. 12, 2011 (17 pages).
Current Claims in PCT International Application No. PCT/EP11/57154 dated Oct. 2011 (4 pages).

* cited by examiner

*Primary Examiner* — Daniel M Pasiewicz
(74) *Attorney, Agent, or Firm* — Hickman Palermo Truong Becker Bingham Wong LLP (57) ABSTRACT

A method and apparatus for performing a digital zoom operation on an input Bayer format image is provided, the output of the digital zoom operation being a second Bayer format image corresponding to the input Bayer format imaged enlarged by a zoom factor.

19 Claims, 7 Drawing Sheets
(1 of 7 Drawing Sheet(s) Filed in Color)

| G | B | G | B | G |
|---|---|---|---|---|
| R | G | R | G | R |
| G | B | G | B | G |
| R | G | R | G | R |
| G | B | G | B | G |

DIGITAL ZOOM ON BAYER

FIELD OF THE INVENTION

Techniques described herein relate to digital image processing, and more particularly to a digital zoom operation.

BACKGROUND

Image acquisition devices such as cameras typically use optical zoom techniques, digital zoom techniques, or a combination of both to allow a user to narrow the viewing angle of an image and to enlarge an object within the image. While optical zoom techniques typically involve adjusting the optical properties of lenses in the camera, digital zoom techniques involve manipulating image data by cropping a region within a full color image and resizing the cropped region back to the full size of the original image.

For example, in a full image with a resolution of 1920×1080, a zoom factor of two can be achieved by identifying a 960×540 region in the image and resizing the region back to 1920×1080. The process of resizing the cropped region involves pixel interpolation because the zoomed image has twice as many pixels as the cropped region, and thus in order to determine values for all the pixels in the zoomed image, a pixel interpolation algorithm must be used. Pixel interpolation algorithms typically involve degradation of image quality.

In spite of this image degradation, digital zoom is still a highly desired feature on digital image acquisition devices because it can be used to increase the zoom achieved by optical zoom techniques, and some devices, such as smartphones, are incompatible with optical zoom because optical zoom requires moving parts. Accordingly, there exists in the art a need for a digital zoom technique that minimizes image degradation but also can be implemented using limited hardware resources like those found in smartphones.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Overview of Zoom Operation
3.0 Demosaicing Algorithm
3.1 Interpolation Direction For High-Frequency Data
3.2 Interpolation Direction For Medium-Frequency Data
3.3 Interpolation in the Selected Direction
3.4 Image Improvement Based on Median Filter
3.5 Demosaicing for Colors B and R
4.0 Projection of Image on Bayer Matrix
5.0 Implementation Mechanisms—Hardware Overview
5.1 Example Mobile Device
5.2 Example Computer System
6.0 Extensions and Alternatives 1.0—General Overview Digital zooming is commonly performed on a full color image, after a demosaicing process is completed. In a digital zoom operation, a small area is selected from the original image and enlarged (by re-sampling) back to the full size of the original image, a process that entails minimizing the field of view. Techniques are described herein for digitally zooming, where the zoom is performed directly on information obtained from the camera, prior to the demosaicing process.

Figure 1A:
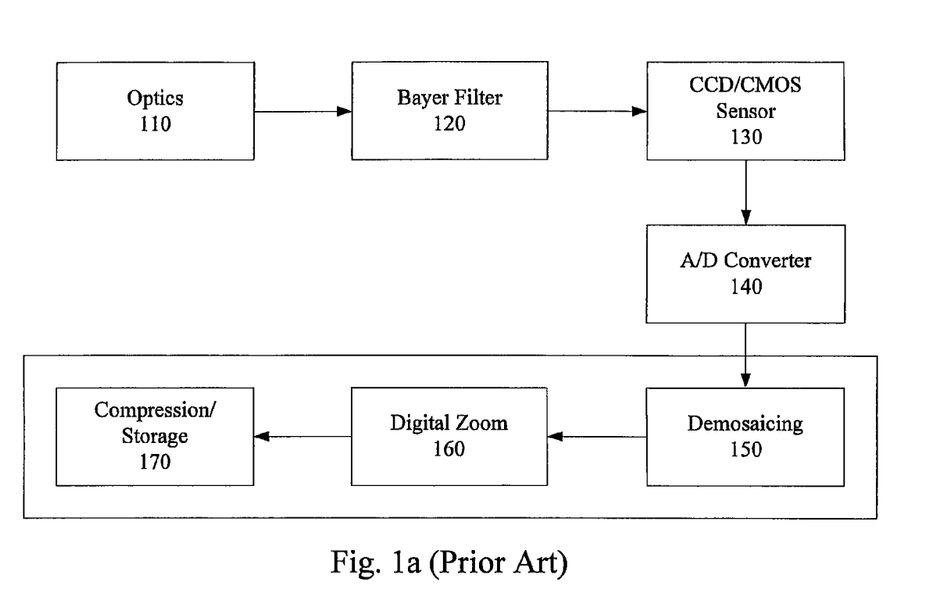
FIGS. 1a-b show block diagrams of a digital image acquisition device as known in the art and a digital image acquisition device embodying techniques of the present disclosure.

FIG. 1a is an example of a block diagram of a digital image acquisition device, such as a camera or smartphone, as known in the art. Optics 110 such as a lens or series of lenses receive light and pass the light through one or more Bayer filters 120. CCD or CMOS sensors 130 convert the light into analog data, and an analog-to-digital converter 140 converts the analog data into digital data. The digital data output by the analog-to-digital converter 140 is a Bayer format image, also referred to as a Bayer pattern. In a Bayer pattern, each pixel contains information that relates to only one color component, for instance, red, green or blue. Typically, the Bayer pattern includes a green pixel in every other space, and, in each row, either a blue or a red pixel occupies the remaining spaces. The end result is a mosaic made of red, green and blue points, where there are twice as many green points as red or blue. This mosaic can accurately represent an image because the human eye is more sensitive to the green data than either the red or blue.

The Bayer format image is passed to demosaicing logic 150 that reconstructs a full color image from the Bayer format image. Demosaicing generally refers to interpolating missing color values at one or more pixel locations to estimate red, green, and blue color channels. Digital zoom logic 160 then executes a zoom function on the full color image, and compression/storage logic 170 stores the new image created by the zoom function.

Figure 1B:
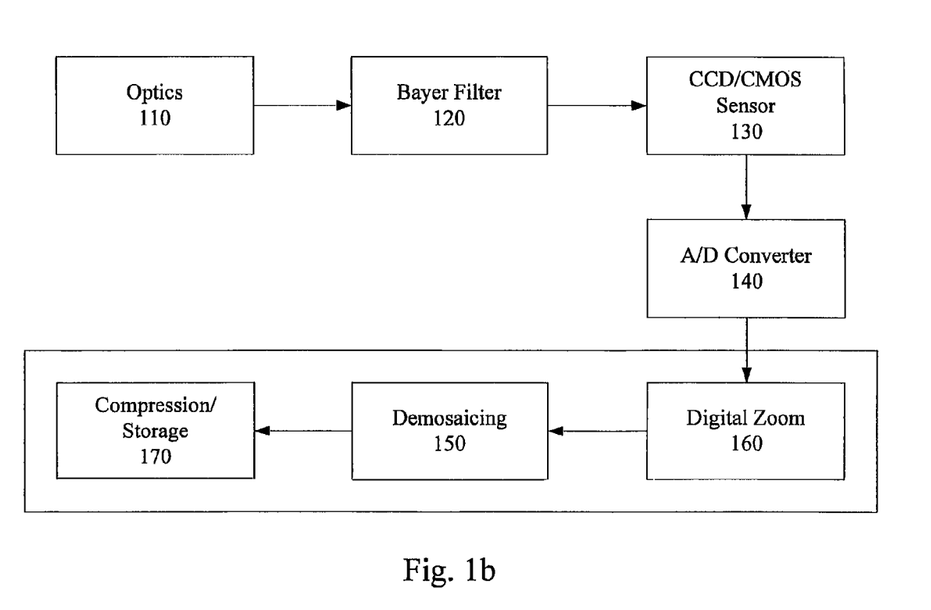

FIG. 1b is an example of a block diagram of a system embodying techniques for performing a digital zoom operation on a Bayer format image. Referring to FIG. 1b, the digital zoom logic 160 executes the digital zoom function directly on the Bayer format image received from analog-to-digital converter 140, and the demosaicing logic 150 only operates on a high resolution, zoomed Bayer format image.

Techniques are described hereafter for generating an image that is enlarged by a rational factor (i.e. continuous zoom is possible). The enlarged image thus generated is also in Bayer format. The rational factor can be a value between a maximum zoom factor and a minimum zoom factor. In some embodiments, the enlarged image can be generated using an adaptive zoom operation, i.e. a zoom operation that studies the structure of the image surrounding each pixel, and then performs the interpolation according to the local information pattern. The zoom operation takes only the relevant area of the photographed Bayer image that is designated for enlargement, referred to as the cropped image.

2.0—Overview of Digital Zoom Operation

Figure 2:
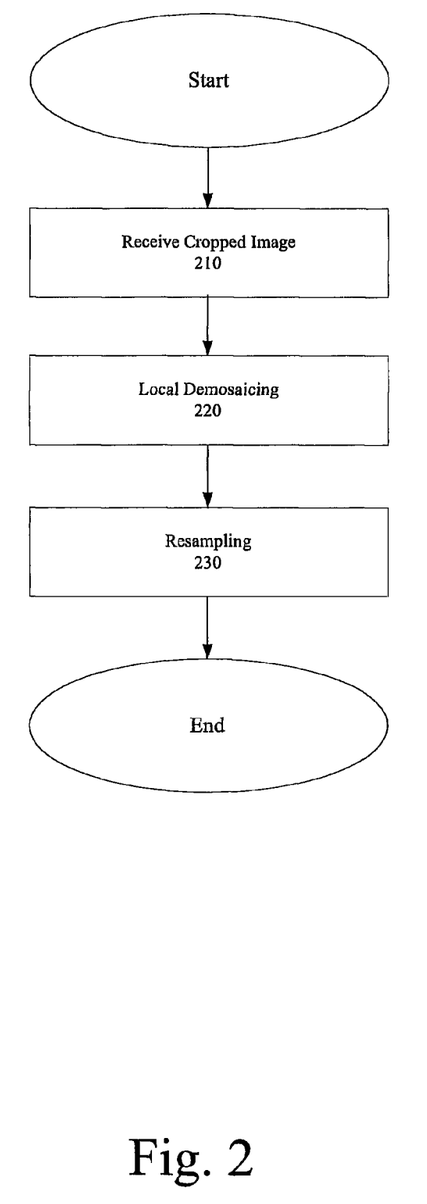
FIG. 2 shows a flow chart of a digital zoom operation embodying techniques described herein.
Figure 3A:
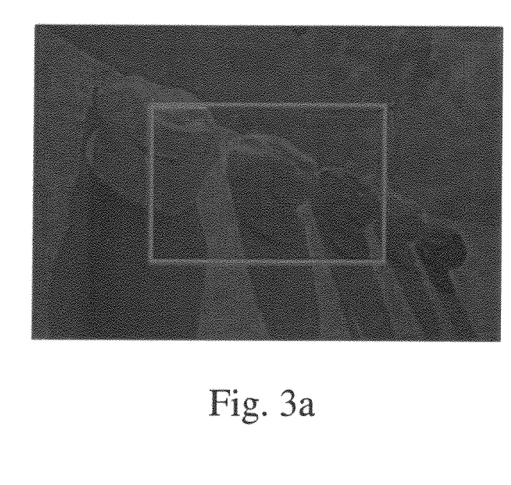
FIGS. 3a-b show examples of a Bayer image with an identified cropped region and a zoomed Bayer image of the cropped region.
Figure 3B:
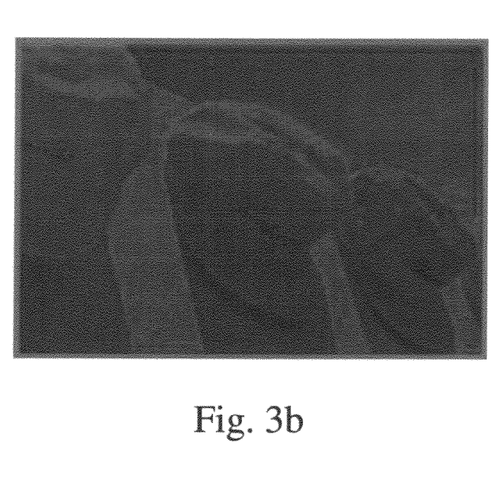

FIG. 2 shows a flow chart for a digital zoom operation embodying techniques described herein. The zoom operation receives as input, the relevant area of the Bayer image designated for enlargement, also referred to as the cropped image (block 210). FIG. 3a shows an example of a full image with a cropped region identified, and FIG. 3b shows the cropped region resized to the size of the original image.

The input to the zoom operation is the cropped region from the original Bayer image, which is of a size M×N, where:

$$in[i, j] = \begin{cases} in_R[i, j] & \text{for } i \text{ even and } j \text{ odd} \\ in_B[i, j] & \text{for } i \text{ odd and } j \text{ even} \\ in_C[i, j] & \text{otherwise} \end{cases}$$

where i denotes the row number, j denotes the column number, and R, G and B represent the pixel colors red, green and blue, respectively. The output of the zoom operation is an rM×rN sized Bayer image $$out[i, j] = \begin{cases} out_R[i, j] & \text{for } i \text{ even and } j \text{ odd} \\ out_B[i, j] & \text{for } i \text{ odd and } j \text{ even} \\ out_C[i, j] & \text{otherwise} \end{cases}$$

where r is the zoom factor.

It can be difficult to zoom when each pixel contains only the red, green, or blue information because it is impossible to know, when calculating the value of an enlarged-image pixel of a certain color, how to weight the samplings of the other colors. Thus, according to one embodiment, the zoom process begins by applying local demosaicing (block 220).

Local Demosaicing

According to one embodiment, local demosaicing involves determining the green image, and using the complete green image to help in the calculation of red and blue images so that a complete RGB image can be obtained as the final output of the demosaicing process. As shall be explained in greater detail hereafter, the complete green image is determined based on interpolation according to a direction. The techniques used to select the direction of interpolation shall be described in greater detail hereafter.

The application of local demosaicing disassociates the coupling between the different colors and constructs a full color image. According to one embodiment, local demosaicing yields three images of the original M×N size, denoted R_dem[i,j], G_dem[i,j], B_dem[i,j], also denoted generically as R, G, and B. Local demosaicing produces a full color image comprising three full single-color planes (R, G and B). Prior to the demosaicing process, there is only one plane composed of 3 colors interleaved in BAYER order. Local demosaicing enables extraction of all possible information from one color about another color so that the three images (R, G, and B) can continue to be processed separately to obtain the desired enlarged image. The process of the demosaicing transfers information between color channels so that the final full R, G and B image that comprise the full-color image is sharp and rich with details.

After local demosaicing has been performed at block 220, each of the three images produced by the local demosaicing operation is separately resampled to obtain the desired samples on the enlarged, rM×rN Bayer grid (depending on the desired zoom factor) (block 230). The zoom process is completed by creating the enlarged Bayer image from the full image obtained at the end of the demosaicing process. At this stage, the image is available in full format (and not only on the Bayer array), and therefore resampling can be performed by projecting each of the images (R, G, B) on the enlarged Bayer array and executing regular linear interpolation in order to calculate the desired samples for each pixel.

Demosaicing

The process of the digital zoom on BAYER is composed of 2 stages—the first is a good demosaicing and the second is the enlargement. According to one embodiment, the demosaicing process involves checking whether the local region around the middle pixel currently being process has high-frequency information and making a decision as to the direction of interpolation (horizontal, vertical or non-directional) based on if the region has high-frequency information. The green image is interpolated according to the direction selected, and the complete green image is used in the calculation of the red and blue images so that a complete RGB image will be obtained as a final output.

Demosaicing methods can be classified as non-adaptive (linear methods) and adaptive. Non-adaptive methods use convolution with filters (or alternately, masks) to interpolate the image for missing samples. Adaptive methods perform a more complex calculation by pre-analyzing the image with the objective of determining the image's geometry, and only then is the interpolation performed for each pixel, based on the structure of the pixel's surroundings.

A common method of adaptive demosaicing is to check, for each of the image's pixels, whether it is in an edge zone with a horizontal or vertical direction. If the pixel is indeed found to be in such an area, interpolation will be performed taking into account only those pixels in the edge's direction. A notable feature of using a Bayer grid is that high-frequency spatial information is coupled with the color of the image. As a result, demosaicing methods may lead to the appearance of false colors, referred to commonly as the false colors phenomenon.

Due to the coupling between high-frequency information and the color of the image, a tradeoff between the two exists. Thus, techniques of the present disclosure include setting a specific threshold so that when the operation of checking the frequency content of the region around the middle pixel currently being processed encounters information at frequencies that are higher than that value, it can be assumed that the image was less colorful, since colors that appear at such high frequencies are expected to be false colors. The present disclosure refers to regions with high-frequency information as opposed to regions with medium-frequency information.

3.0—Demosaicing Process

Figure 4:
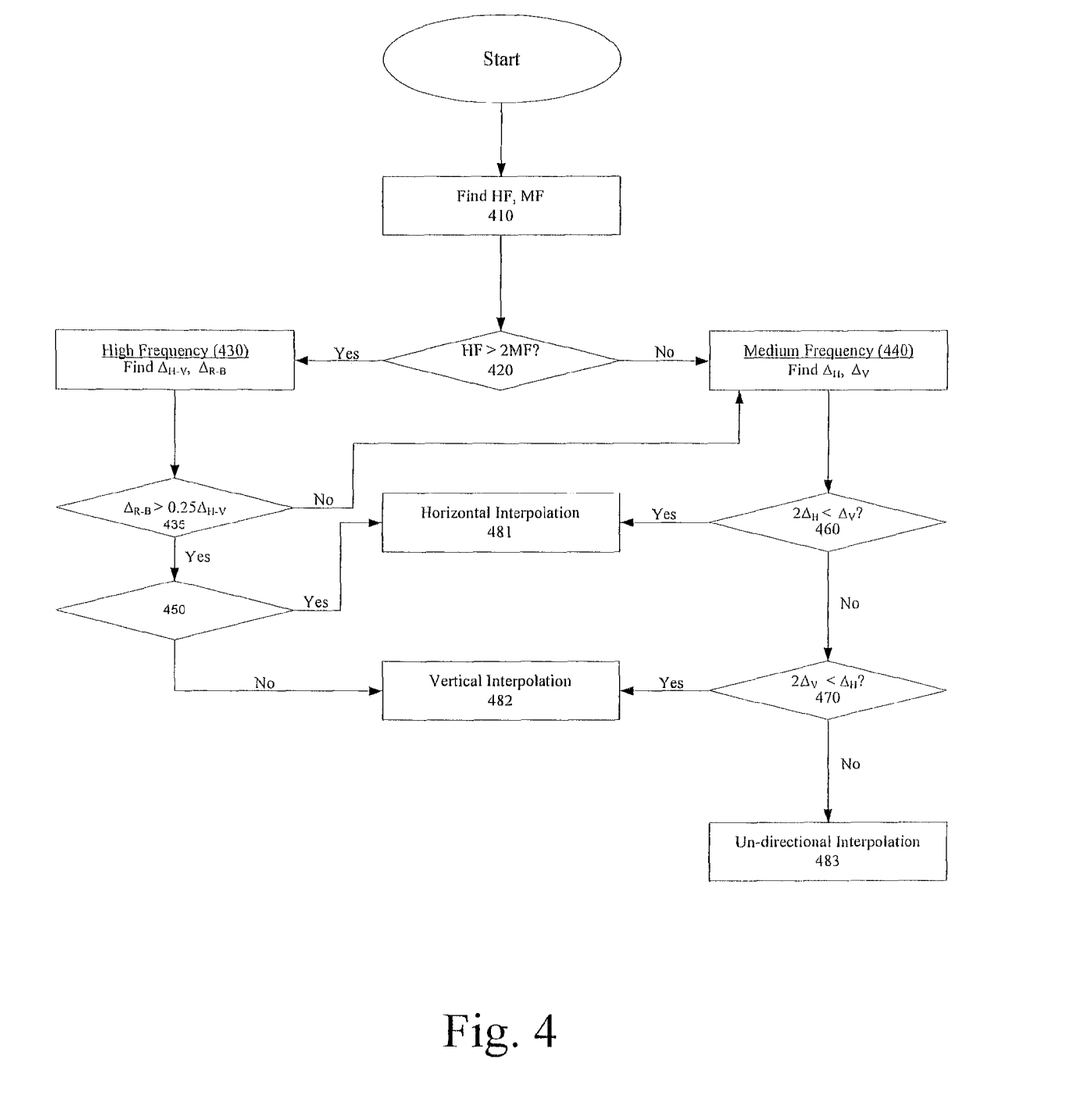
FIG. 4 shows a flow chart of a demosaicing algorithm of the green component embodying techniques described herein.

Techniques described herein include a decision making operation for calculating the sampling of G in an R pixel. For G in a B pixel, one should swap all reference to B and R. For a green pixel in a Bayer format image, a high frequency estimation value (HF) and a medium frequency estimation value (MF) are determined (block 410). Based on the determined HF and MF values, the pixel is determined to be either "high frequency" (block 420, yes) or "medium frequency" (block 420, no). In one embodiment, pixels with an HF value of more than twice the MF value are identified as being high frequency pixels, while frequencies with HF values less than twice the MF value are identified as being low frequency. High-frequency and medium-frequency generally describe the amount of variation between light sensed by a sensor for pixels that are close to one another, with high variance corresponding to high-frequency pixels and lower variance corresponding to medium-frequency. To examine whether the pixel under consideration (i, j) is located within a high or medium spatial frequency region, the following equations can be used:

$$HF = \left| \sum_{m=0,\pm 2} \sum_{n=\pm 1} in_G[i+m, j+n] - \sum_{m=\pm 1} \sum_{n=0,\pm 2} in_G[i+m, j+n] \right|$$

$$MF = \sum_{(m,n)=(0,0),(\pm 1,\pm 1)} |in_G[i+m+1, j+n] - in_G[i+m-1, j+n]| +$$

$$\sum_{(m,n)=(0,0),(\pm 1,\pm 1)} |in_G[i+m, j+n+1] - in_G[i+m, j+n-1]|$$

where HF and MF are the high- and medium-frequency estimation values. HF is the absolute value of the differences of the green pixel values located close to the central red pixel (i, j) which increase for high frequency values. The MF value takes into account only vertical and horizontal pixel pairs and, therefore, the absolute value is an estimation of the slowly changing signal near the half of Nyquist frequency. Therefore, if the HF value is greater than twice the MF value, then the pixel is identified as high frequency. Otherwise, the pixel is identified as medium frequency.

3.1—Interpolation Direction for High-Frequency Data

For high frequency pixels (block 420, yes), $\Delta_{H-V}$ and $\Delta_{R-B}$ values are determined (block 430). The horizontal and vertical variances can be calculated using data from adjacent pixels, such that:

$$\Delta_{H-V} = in_G[i,j+1] + in_G[i,j-1] - in_G[i+1,j] - in_G[i-1,j]$$

The difference between a central red pixel and the average of the first neighbor's blue pixels, is calculated by:

$$\Delta_{R-B} = in_R[i, j] - \frac{in_B[i-1, j-1] + in_B[i+1, j-1] + in_B[i-1, j+1] + in_B[i+1, j+1]}{4}$$

By comparing the difference values, $\Delta_{H-V}$ and $\Delta_{R-B}$, the following decision is obtained:

High Frequency (block 435, yes) for $|\Delta_{R-B}| > 0.25|\Delta_{H-V}|$
Medium Frequency (block 435, no) otherwise.

The decision of block 435 is an additional verification that the pixel is located in a high frequency area. If the determination is medium frequency (block 435, no), then the high frequency determination of block 420 is overridden, and an interpolation direction is determined for medium frequency data (block 440).

If the decision is "high frequency" (block 435, yes), then the interpolation direction is chosen to provide the result closest to the red value and a much grayer picture is produced. In this manner very fine textures can be reconstructed without producing false colors. The determination between horizontal interpolation and vertical interpolation for high frequency pixels is determined as follows:

Horizontal Interpolation (block 450, yes) for ($\Delta_{R-B} > 0$ and $\Delta_{H-V} > 0$) or ($\Delta_{R-B} < 0$ and $\Delta_{H-V} < 0$);

Vertical Interpolation (block 450, no) for ($\Delta_{R-B} > 0$ and $\Delta_{H-V} < 0$) or ($\Delta_{R-B} < 0$ and $\Delta_{H-V} > 0$).

The decision criteria may be improved by using a voting method and thus preventing any mistakes due to noise. This stage provides the interpolation direction that is to be implemented later on.

3.2—Interpolation Direction for Medium-Frequency Data

For medium frequency pixels (block 420, no), $\Delta_H$ and $\Delta_V$ values are determined (block 440). The standard gradient calculation for the medium-frequency region is implemented on all directions to obtain a rate of data change in each direction. In a given edge region when the gradient of any direction is found to be very small, it can be assumed that there is an edge close by in that direction, and hence interpolation is applied in that direction. The gradient values can be obtained using the following equations:

$$\Delta_H = \sum_{m=-1}^{1} \sum_{n=-1}^{1} a_{mn} |in[i+m, j+n+1] - in[i+m, j+n-1]| + \sum_{\substack{(m,n)=(0,\pm 1), \\ (0,\pm 3),(\pm 1,0)}} b_{mn}$$

$$|-in[i+m, j+n-3] + 2in[i+m, j+n-2] - in[i+m, j+n-1] +$$
$$in[i+m, j+n+3] - 2in[i+m, j+n+2] + in[i+m, j+n+1]| +$$

$$\sum_{n=-1}^{1} c_n |-in[i-1, j+n-1] + 2in[i-1, j+n] - in[i-1, j+n+1] +$$
$$in[i+1, j+n-1] - 2in[i+1, j+n] + in[i+1, j+n+1]|$$

$$\Delta_V = \sum_{m=-1}^{1} \sum_{n=-1}^{1} a_{mn} |in[i+m+1, j+n] - in[i+m-1, j+n]| +$$

$$\sum_{\substack{(m,n)=(\pm 1,0), \\ (\pm 3,0),(0,\pm 1)}} b_{mn}$$

$$|-in[i+m-3, j+n] + 2in[i+m-2, j+n] - in[i+m-1, j+n] +$$
$$in[i+m+3, j+n] - 2in[i+m+2, j+n] + in[i+m+1, j+n]| +$$

$$\sum_{m=-1}^{1} c_m |-in[i+m-1, j-1] + 2in[i+m, j-1] - in[i+m+1, j-1] +$$
$$in[i+m-1, j+1] - 2in[i+m, j+1] + in[i+m+1, j+1]|$$

where $\Delta_H$ and $\Delta_V$ denote the horizontal and vertical gradients, respectively, and $a_{mn}$, $b_{mn}$, and $c_m$ are coefficients that can be experimentally determined in order to govern the result. As an example, the following coefficients can be used:

$a_{0,0} = 4 \quad a_{\pm 1,0} = 3 \quad a_{0,\pm 1} = 2 \quad a_{\pm 1,\pm 1} = 1$ $b_{0,\pm 1} = 3 \quad b_{0,\pm 3} = 2 \quad b_{\pm 1,0} = 1$ $c_0 = 4 \quad c_{\pm 1} = 2$ Based on the above parameters, the interpolation direction can also be determined for medium-frequency regions, as follows:

Horizontal Interpolation (block 460, yes) for $2\Delta_H < \Delta_V$;
Vertical Interpolation (block 470, yes) for $2\Delta_V > \Delta_H$;
Non-directional Interpolation (block 470, no) otherwise.

3.3—Interpolation in the Selected Direction

Interpolation is based on the adjacent pixels in the direction that was determined. Based on the assumption that the high-frequency terms are similar for all colors, an additional correction term based on the HF value of the other colors can be added. Horizontal Interpolation (block 481) and Vertical Interpolation (block 482) can be calculated by the following equations.

$$H: G_{dem[i,j]} = \frac{in_G[i, j-1] + in_G[i, j+1]}{2} + \frac{2in_R[i,j] - in_R[i, j-2] - in_R[i, j+2]}{4}$$

$$V: G_{dem[i,j]} = \frac{in_G[i-1,j] + in_G[i,1+j]}{2} + \frac{2in_R[i,j] - in_R[i-2, j] - in_R[i+2, j]}{4}$$

For regions with a non-horizontal or vertical interpolation direction, the image data can be interpolated using various possibilities of weighted averaging over the first four nearest neighbors. To improve accuracy, the two extreme samplings can be disregarded. Such a technique has an advantage over standard adaptive operations because of simpler hardware architecture, as shown by the following equation for Non-directional Interpolation (block 483).

non-$H/V$:

$$A = \begin{Bmatrix} in_G[i, j-1] - 0.5in_R[i, j-2], & in_G[i, j+1] - 0.5in_R[i, j+2], \\ in_G[i-1, j] - 0.5in_R[i-2, j], & in_G[i+1, j] - 0.5in_R[i+2, j] \end{Bmatrix}$$

$$G\_dem[i, j] = \frac{1}{2}in_R[i, j] + \frac{sum(A) - max(A) - min(A)}{2}$$

The non-H/V equation is simple to implement and yields improved results compared with standard averaging methods.

3.4—Image Improvement Based on Median Filter

As demosaicing leads to false colors, techniques of the present disclosure include applying a median filter to reduce noise and false colors in the image data. The median filter can be applied as follows to redefine the demosaiced green image:

$$G\_dem[i, j] = $$
$$\text{median}\{in_R[i, j] + G\_dem[i+m, j+n] - in_R[i+m, j+n]\}_{\substack{(m,n)=(0,0),\\(0,\pm 2),(\pm 2,0)}}$$

3.5—Demosaicing for Colors B and R

Based on the high correlation between the high-frequency terms of the different colors, the demosaicing process can be completed by calculating the complete details for the R and B images as follows:

$R\_dem = \text{INTERP}\{in_R\} + \text{HPF}\{G\_dem\}$ $B\_dem = \text{INTERP}\{in_B\} + \text{HPF}\{G\_dem\}$ As an example, the calculation for the R pixel is as follows: for i and j odd:

$$R\_dem[i, j] = \frac{in_R[i-1, j] + in_R[i+1, j]}{2} + G\_dem[i, j] - \frac{G\_dem[i-1, j] + G\_dem[i+1, j]}{2}$$

for i and j even:

$$R\_dem[i, j] = \frac{in_R[i-1, j] + in_R[i+1, j] + in_R[i, j-1] + in_R[i, j+1]}{4} + G\_dem[i, j] - \frac{(G\_dem[i-1, j] + G\_dem[i+1, j] + G\_dem[i, j-1] + G\_dem[i, j+1])}{4} \quad (4)$$

for i even and j odd:

$R_{dem[i,j]} = in_R[i,j]$ for i odd and j even:

$$R_{dem[i,j]} = \frac{in_R[i, j-1] + in_R[i, j+1]}{2} + G_{dem[i,j]} \frac{G_{dem[i,j-1]} + G_{dem[i,j+1]}}{2}$$

The same calculations can be carried out for the B pixel by reversing the indices of the rows and columns

4.0—Projection of Image on Bayer Matrix

Figure 5:
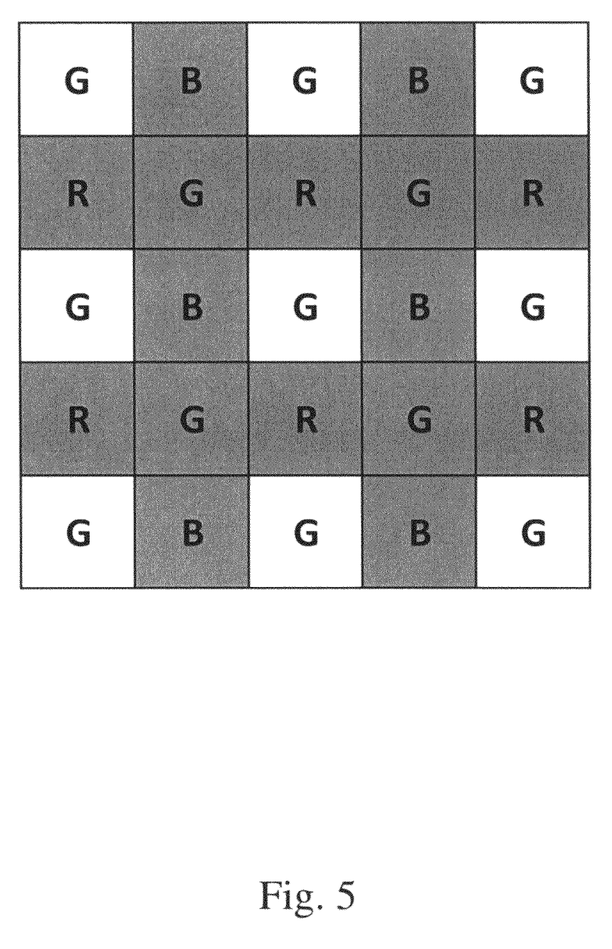
FIG. 5 shows an example of a Bayer image output by techniques described herein.

After local demosaicing, interpolation logic can receive digital image pixel data from the working window (i.e. the R, G, and B images obtained above) and produce interpolated digital image data of the Bayer type. The interpolation logic includes a horizontal and a vertical sampling increment for the output images, which is determined by the desired magnification or zoom factor. FIG. 5 shows an input image projected on the magnified image, with a zoom factor of two.

4.1—Projection of the Demosaiced Image on the Enlarged Bayer Matrix for a Zoom Factor of Two The image obtained from the demosaicing process is projected onto the magnified image (see FIG. 5). All three color components of the highlighted pixels have already been calculated so data for half of the green pixels is already available. To complete the picture and assign values to the remaining pixels so as to obtain a Bayer image, interpolation is carried out as follows:

Half-phase vertical shift of R—As is evident from FIG. 5, each desired R pixel is located above and below two known pixels. Thus, to obtain the desired R samplings, the image can be shifted a distance of one pixel in the vertical direction (such a shift is referred to as a half-phase shift since the original data is provided in intervals of 2 pixels). A bi-linear shift can be performed as follows:

$$out_R[2i, 2j-1] = \frac{R_{dem[i,j]} + R_{dem[i+1,j]}}{2}$$

Half-phase horizontal shift of B—To obtain the desired B samples, the image can be shifted in the same manner in which R was shifted, but in the horizontal direction:

$$\text{out}_B[2i-1, 2j] = \frac{B_{dem[i,j]} + B_{dem[i,j+1]}}{2}$$

Completing the missing G samplings—As each missing G sample is located between four known samples, averaging may be performed, as follows:

$$\text{out}_G[2i, 2j] = \frac{G_{dem[i,j]} + G_{dem[i,j+1]} + G_{dem[i+1,j]} + G_{dem[i+1,j+1]}}{4}$$

To improve accuracy, the two extreme samplings can be disregarded, so that the calculation is now:

$$A = \{G\_dem[i, j], G\_dem[i, j+1], G\_dem[i+1, j], G\_dem[i+1, j+1]\}$$

$$\text{out}_G[2i, 2j] = \frac{\text{sum}(A) - \max(A) - \min(A)}{2}$$

And the zoom operation is completed.

For the general case of any rational zoom factor, the image obtained from the demosaicing process is projected onto the magnified image, and normal linear interpolation is performed to calculate the desired samplings for the Bayer matrix. Bi-linear interpolation (discussed thus far). Slpines interpolation is another example of linear interpolation technique that yield sharper results and offers an advantage at low zoom factors (close to 1).

4.2 Projection of the Demosaiced Image on the Enlarged Bayer Matrix for a Rational Zoom Factor After demosaicing, a full color image is available:

R_dem[i, j], G_dem[i, j], B_dem[i, j]

In order to calculate the zoomed Bayer image, for an arbitrary zoom factor (r), a linear interpolation of the desired samples can be used. For any filter h(x), this can be calculated by:

$$\text{out}_R[i, j] = \sum_m \sum_n R\_dem[m, n] \cdot h\left(\frac{i}{r} - m\right) \cdot h\left(\frac{j}{r} - n\right) \text{ for } i \text{ even and } j \text{ odd}$$

$$\text{out}_B[i, j] = \sum_m \sum_n B\_dem[m, n] \cdot h\left(\frac{i}{r} - m\right) \cdot h\left(\frac{j}{r} - n\right) \text{ for } i \text{ odd and } j \text{ even}$$

$$\text{out}_G[i, j] = \sum_m \sum_n G\_dem[m, n] \cdot h\left(\frac{i}{r} - m\right) \cdot h\left(\frac{j}{r} - n\right) \text{ otherwise}$$

An example for h(x) might be to select a bi-linear filter:

$$h_{linear}(x) = \begin{cases} 1 - |x|, & \text{for } |x| < 1 \\ 0, & \text{otherwise} \end{cases}$$

An alternative example for h(x) is a cubic B-Spline filer, which yields sharper results and offers an advantage at low zoom factors (closer to 1):

$$h^3_{B\text{-}Spline}(x) = \begin{cases} \frac{1}{2}|x|^3 - |x|^2 + \frac{2}{3}, & \text{for } |x| < 1 \\ -\frac{1}{6}|x|^3 + |x|^2 - 2|x| + \frac{4}{3}, & \text{for } 1 < |x| < 2 \\ 0, & \text{otherwise} \end{cases}$$

5.0—Hardware Overview 5.1—Example Mobile Device

Figure 6:
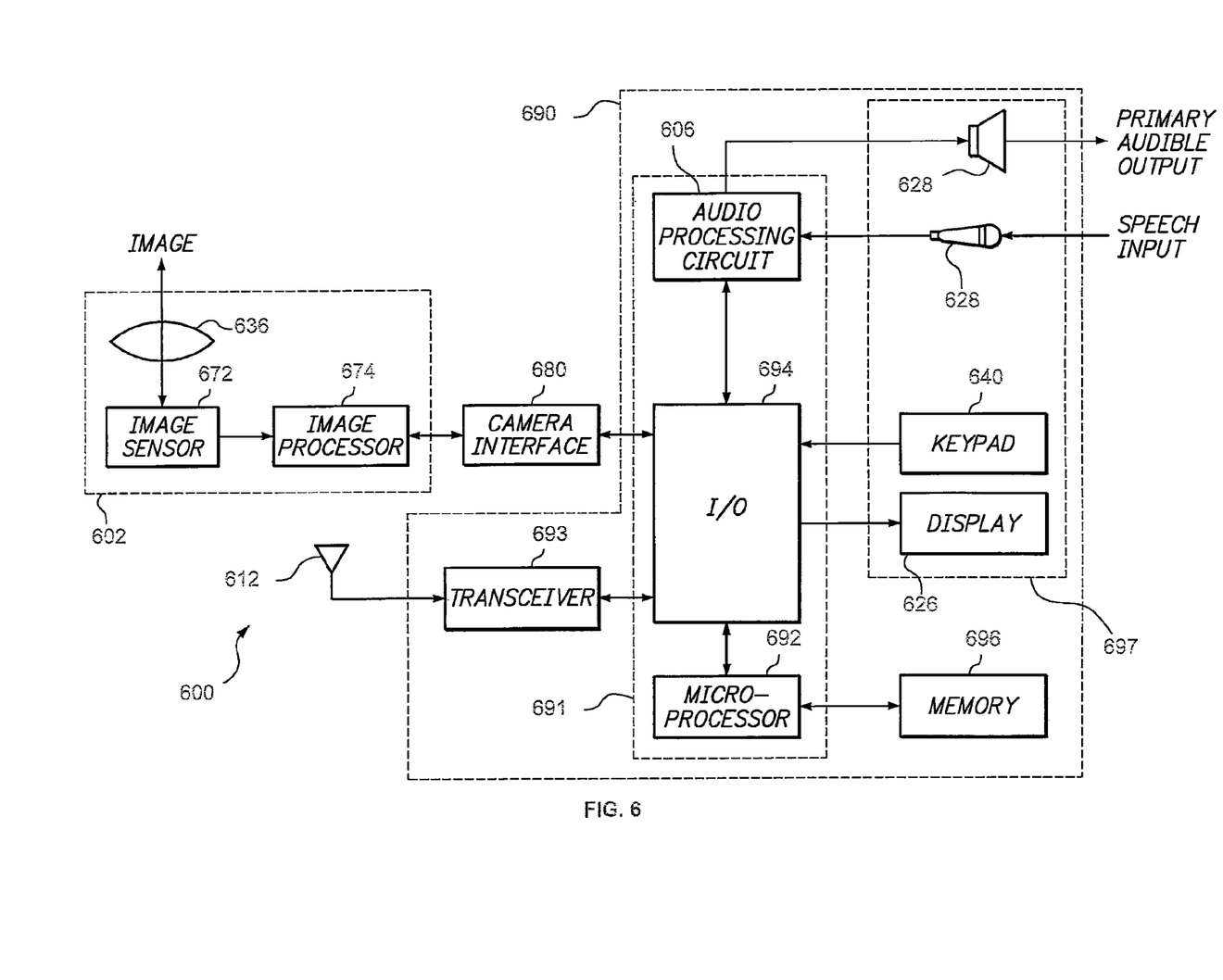
FIG. 6 shows a block diagram for an example mobile device upon which techniques described herein may be implemented.

FIG. 6 illustrates a block diagram for an example mobile device 600 in which embodiments of the present invention may be implemented. Mobile device 600 comprises a camera assembly 602, camera and graphics interface 680, and a communication circuit 690. Camera assembly 670 includes camera lens 636, image sensor 672, and image processor 674. Camera lens 636, comprising a single lens or a plurality of lenses, collects and focuses light onto image sensor 672. Image sensor 672 captures images formed by light collected and focused by camera lens 636. Image sensor 672 may be any conventional image sensor 672, such as a charge-coupled device (CCD) or a complementary metal oxide semiconductor (CMOS) image sensor. Image processor 674 processes raw image data captured by image sensor 672 for subsequent storage in memory 696, output to a display 626, and/or for transmission by communication circuit 690. The image processor 674 may be a conventional digital signal processor programmed to process image data, which is well known in the art.

Image processor 674 interfaces with communication circuit 690 via camera and graphics interface 680. Communication circuit 690 comprises antenna 612, transceiver 693, memory 696, microprocessor 692, input/output circuit 694, audio processing circuit 606, and user interface 697. Transceiver 693 is coupled to antenna 612 for receiving and transmitting signals. Transceiver 693 is a fully functional cellular radio transceiver, which may operate according to any known standard, including the standards known generally as the Global System for Mobile Communications (GSM), TIA/EIA-36, cdmaOne, cdma2000, UMTS, and Wideband CDMA.

The image processor 674 may process images acquired by the sensor 672 using one or more embodiments described herein. The image processor 674 can be implemented in hardware, software, or some combination of software and hardware. For example, the image processor 674 could be implemented as part of an application specific integrated circuit (ASIC). As another example, the image processor 674 may be capable of accessing instructions that are stored on a computer readable medium and executing those instructions on a processor, in order to implement one or more embodiments of the present invention.

Microprocessor 692 controls the operation of mobile device 600, including transceiver 694, according to programs stored in memory 696. Microprocessor 692 may further execute portions or the entirety of the image processing embodiments disclosed herein. Processing functions may be implemented in a single microprocessor, or in multiple microprocessors. Suitable microprocessors may include, for example, both general purpose and special purpose microprocessors and digital signal processors. Memory 696 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 692.

Input/output circuit 694 interfaces microprocessor 692 with image processor 674 of camera assembly 670 via camera and graphics interface 680. Camera and graphics interface 680 may also interface image processor 674 with user interface 697 according to any method known in the art. In addition, input/output circuit 694 interfaces microprocessor 692, transceiver 693, audio processing circuit 606, and user interface 697 of communication circuit 690. User interface 697 includes a display 626, speaker 628, microphone 638, and keypad 640. Display 626, disposed on the back of display section, allows the operator to see dialed digits, images, called status, menu options, and other service information. Keypad 640 includes an alphanumeric keypad and may optionally include a navigation control, such as joystick control (not shown) as is well known in the art. Further, keypad 640 may comprise a full QWERTY keyboard, such as those used with palmtop computers or smart phones. Keypad 640 allows the operator to dial numbers, enter commands, and select options.

Microphone 638 converts the user's speech into electrical audio signals. Audio processing circuit 606 accepts the analog audio inputs from microphone 638, processes these signals, and provides the processed signals to transceiver 693 via input/output 694. Audio signals received by transceiver 693 are processed by audio processing circuit 606. The basic analog output signals produced by processed audio processing circuit 606 are provided to speaker 628. Speaker 628 then converts the analog audio signals into audible signals that can be heard by the user.

Those skilled in the art will appreciate that one or more elements shown in FIG. 6 may be combined. For example, while the camera and graphics interface 680 is shown as a separated component in FIG. 6, it will be understood that camera and graphics interface 680 may be incorporated with input/output circuit 694. Further, microprocessor 692, input/output circuit 694, audio processing circuit 606, image processor 674, and/or memory 696 may be incorporated into a specially designed application-specific integrated circuit (ASIC) 691.

5.2—Example Computer System

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
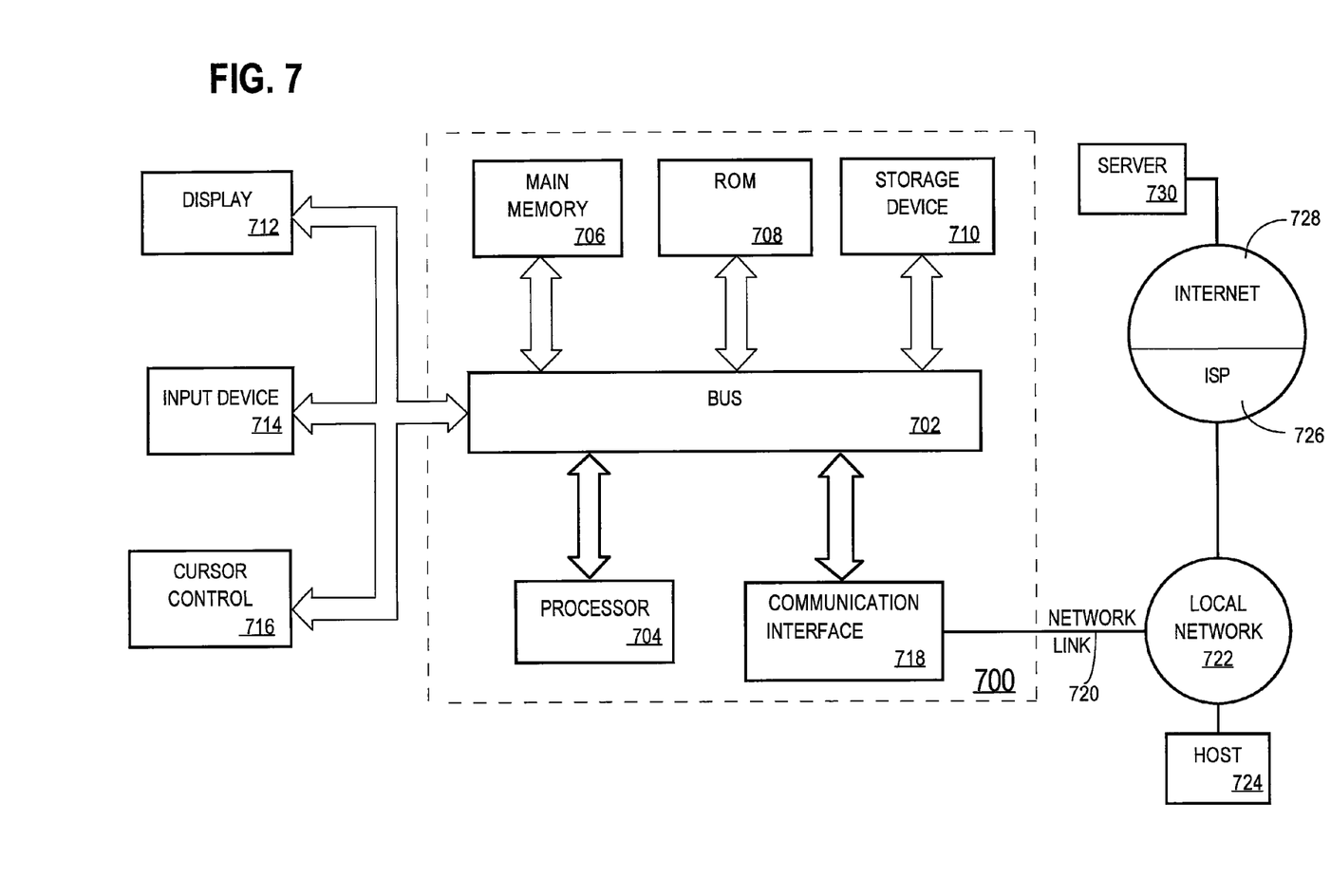
FIG. 7 shows a block diagram for an example computer system upon which techniques described herein may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

6.0—Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving data that indicates an area of a Bayer image designated for enlargement;
    wherein the area has a particular size;
    producing a plurality of single-color images at least in part by, for each of a plurality of colors in the area of the Bayer image, interpolating missing color values, wherein each image of the plurality of single-color images corresponds to a different one of the plurality of colors; and
    after producing the plurality of single-color images, resampling each of the plurality of single-color images to obtain samples for an enlarged Bayer image that reflects the visual content of the area but is larger than the area by a zoom factor;
    wherein the method is performed by one or more computing devices.

2. The method of claim 1 wherein each of the plurality of single-color images has the particular size.

3. The method of claim 1 wherein:
    prior to producing the plurality of single-color images, the Bayer image has a single pane composed of red, green, and blue colors interleaved in Bayer order; and
    the plurality of single-color images comprise a red pane, a green pane, and a blue pane that, when combined, form a full color image.

4. The method of claim 1, wherein producing the plurality of single-color images comprises:
    for a pixel of a particular color in the Bayer image, determining a high-frequency estimation value and a medium-frequency estimation value;
    based at least in part on the high-frequency estimation value and the medium-frequency estimation value, determining whether the pixel is a high-frequency pixel or a medium-frequency pixel;
    based at least in part on determining whether the pixel is a high frequency pixel or a medium frequency pixel, determining a selected direction for performing interpolation;
    based at least in part on the selected direction, performing an interpolation operation on a pixel adjacent to the pixel in an image of the particular color.

5. The method of claim 4, wherein the interpolation operation is chosen from a group comprising: a horizontal interpolation operation, a vertical interpolation operation, and a non-directional interpolation.

6. The method of claim 4, wherein the interpolation operation produces a green image, and based on the green image, a red image and a blue image are determined.

7. The method of claim 6, further comprising:
    based at least in part on the green image, the red image, and the blue image, creating an enlarged Bayer image.

8. The method of claim 4, wherein the high frequency estimation value is based at least in part on a difference between green pixel values near the pixel.

9. The method of claim 4, wherein the medium frequency estimation value is based at least in part on vertical pairs of green pixels and horizontal pairs of green pixels.

10. The method of claim 4, further comprising:
    in response to determining that the pixel is a high frequency pixel, calculating a first value and a second value, wherein the first value is based at least in part on data from green pixels adjacent to the pixel in the Bayer image and the second value is based at least in part on a difference between a central red pixel and nearby blue pixels (or vice versa for calculating green value in a blue pixel) in the Bayer image;

based at least in part on the first value and the second value, choosing between horizontal interpolation operation and a vertical interpolation operation.

11. The method of claim 4, further comprising:

in response to determining that the pixel is a medium frequency pixel, calculating a horizontal gradient value and a vertical gradient value;

based at least in part on the horizontal gradient value and the vertical gradient value, choosing between a horizontal interpolation operation, a vertical interpolation operation, and a non-directional interpolation operation.

12. An apparatus comprising:

a demosaicing unit configured to produce a plurality of single-color images at least in part by, for each of a plurality of colors in the area of the Bayer image, interpolating missing color values, wherein each image of the plurality of single-color images corresponds to a different one of the plurality of colors; and a resampling unit, operatively coupled to the demosaicing unit, configured to resample each of the plurality of single-color images to obtain samples for an enlarged Bayer image that reflects the visual content of the specified area but is larger than the area by a zoom factor.

13. The apparatus of claim 12, wherein the demosaicing unit is further configured to perform:

for a pixel in the Bayer image, determining a high-frequency estimation value and a medium-frequency estimation value;

based at least in part on the high-frequency estimation value and the medium-frequency estimation value, determining whether the pixel is a high-frequency pixel or a medium-frequency pixel;

based at least in part on determining whether the pixel is a high frequency pixel or a medium frequency pixel, determining a selected direction for performing interpolation;

based at least in part on the selected direction, performing an interpolation operation on a pixel adjacent to the pixel.

14. The apparatus of claim 12 wherein:

the input to the demosaicing unit is a portion of a Bayer image that has a single pane composed of red, green, and blue colors interleaved in Bayer order; and the plurality of single-color images comprise a a red pane, a green pane, and a blue pane that, when combined, form a full color image.

15. A non-transitory computer-readable medium storing instructions which, when executed by one or more processors, cause:

receiving data that indicates an area of a Bayer image designated for enlargement;

wherein the area has a particular size;

producing a plurality of single-color images at least in part by, for each of a plurality of colors in the area of the Bayer image, interpolating missing color values, wherein each image of the plurality of single-color images corresponds to a different one of the plurality of colors; and after producing the plurality of single-color images, resampling each of the plurality of single-color images to obtain samples for an enlarged Bayer image that reflects the visual content of the area but is larger than the area by a zoom factor.

16. The non-transitory computer-readable medium of claim 15, wherein the instructions, when executed, cause producing the plurality of single-color images at least in part by:

for a pixel of a particular color in the Bayer image, determining a high-frequency estimation value and a medium-frequency estimation value;

based at least in part on the high-frequency estimation value and the medium-frequency estimation value, determining whether the pixel is a high-frequency pixel or a medium-frequency pixel;

based at least in part on determining whether the pixel is a high frequency pixel or a medium frequency pixel, determining a selected direction for performing interpolation;

based at least in part on the selected direction, performing an interpolation operation on a pixel adjacent to the pixel in an image of the particular color.

17. The non-transitory computer-readable medium of claim 16, wherein the interpolation operation is chosen from a group comprising: a horizontal interpolation operation, a vertical interpolation operation, and a non-directional interpolation.

18. The non-transitory computer-readable medium of claim 16, wherein the interpolation operation produces a green image, and based on the green image, a red image and a blue image are determined.

19. The non-transitory computer-readable medium of claim 18, wherein the instructions, when executed, cause, based at least in part on the green image, the red image, and the blue image, creating an enlarged Bayer image.

\* \* \* \* \*